Feb. 10, 1970  H. F. SNIDER  3,494,551
FURNACE CONTROL SYSTEM
Filed Nov. 20, 1967  3 Sheets-Sheet 1
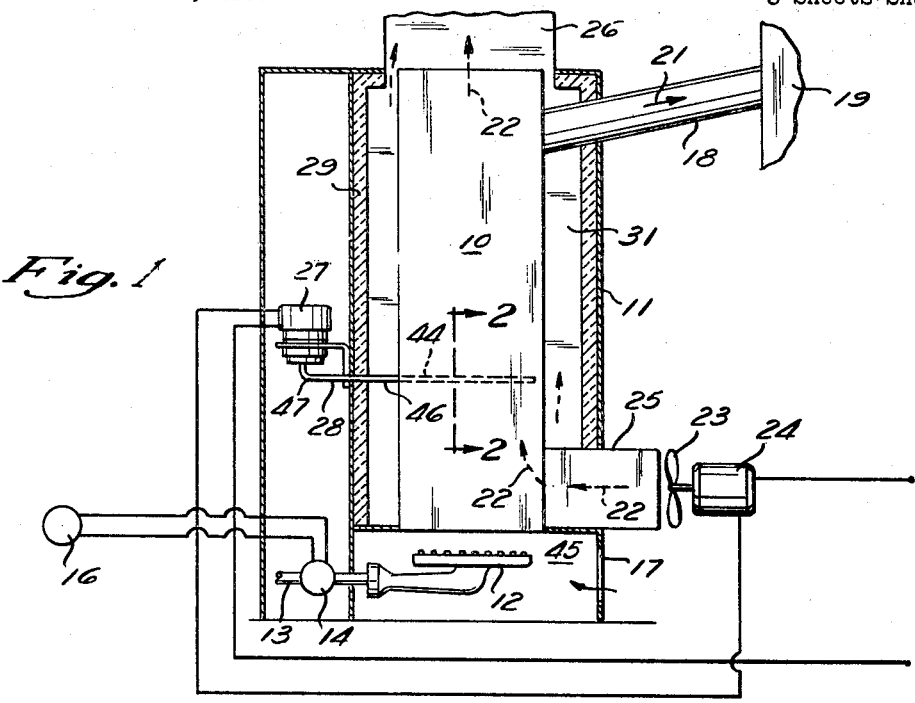
Fig. 1
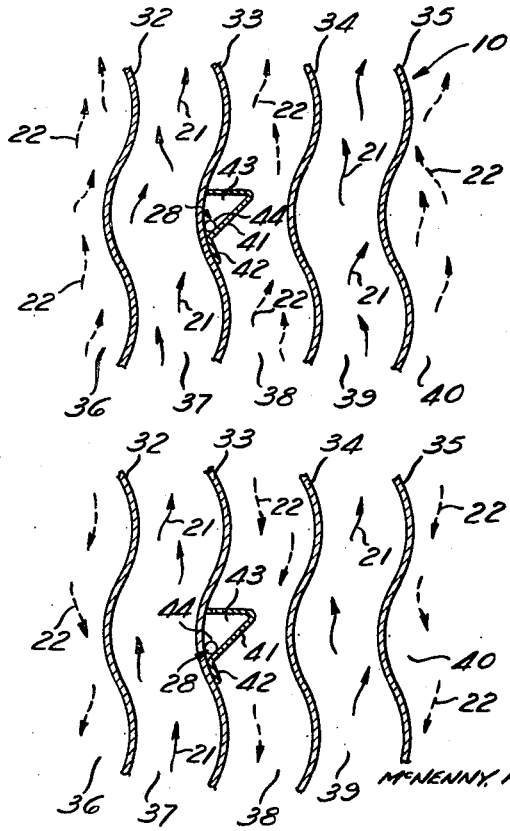
Fig. 2
Fig. 3
INVENTOR.
HAROLD F. SNIDER
BY McNENNY, FARRINGTON, PEARNE & GORDON
ATTORNEYS

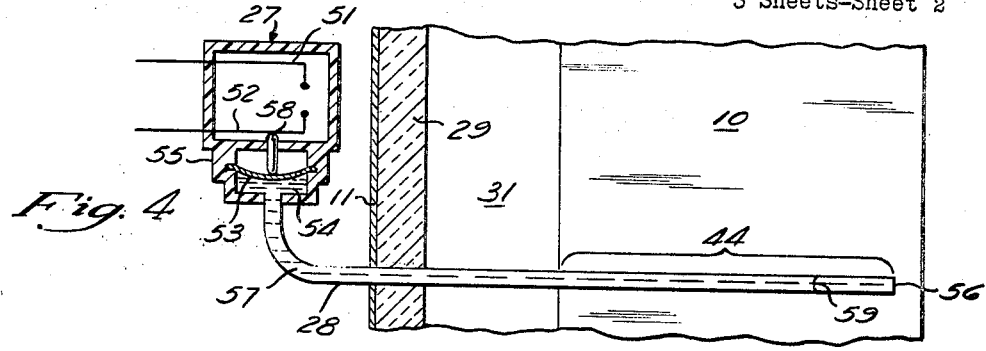
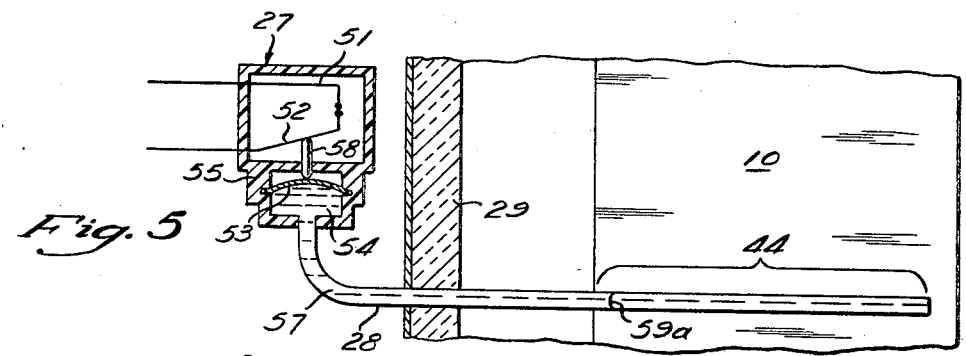
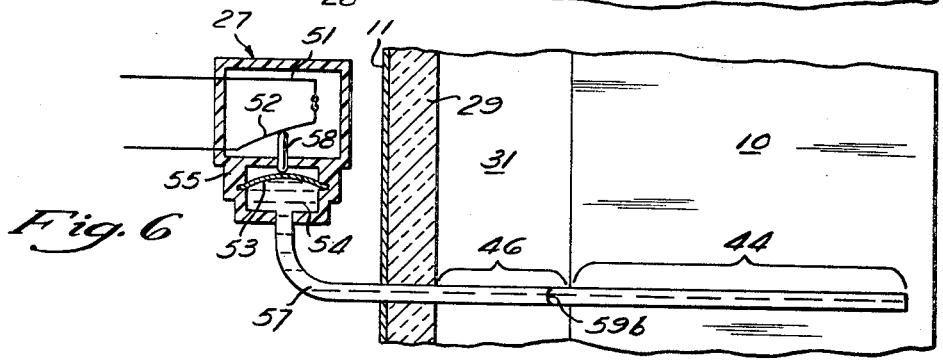
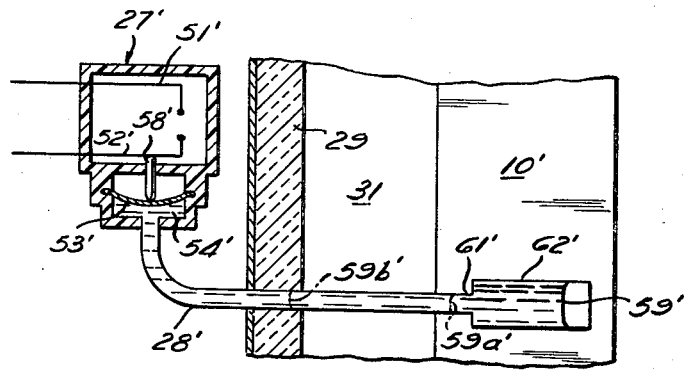

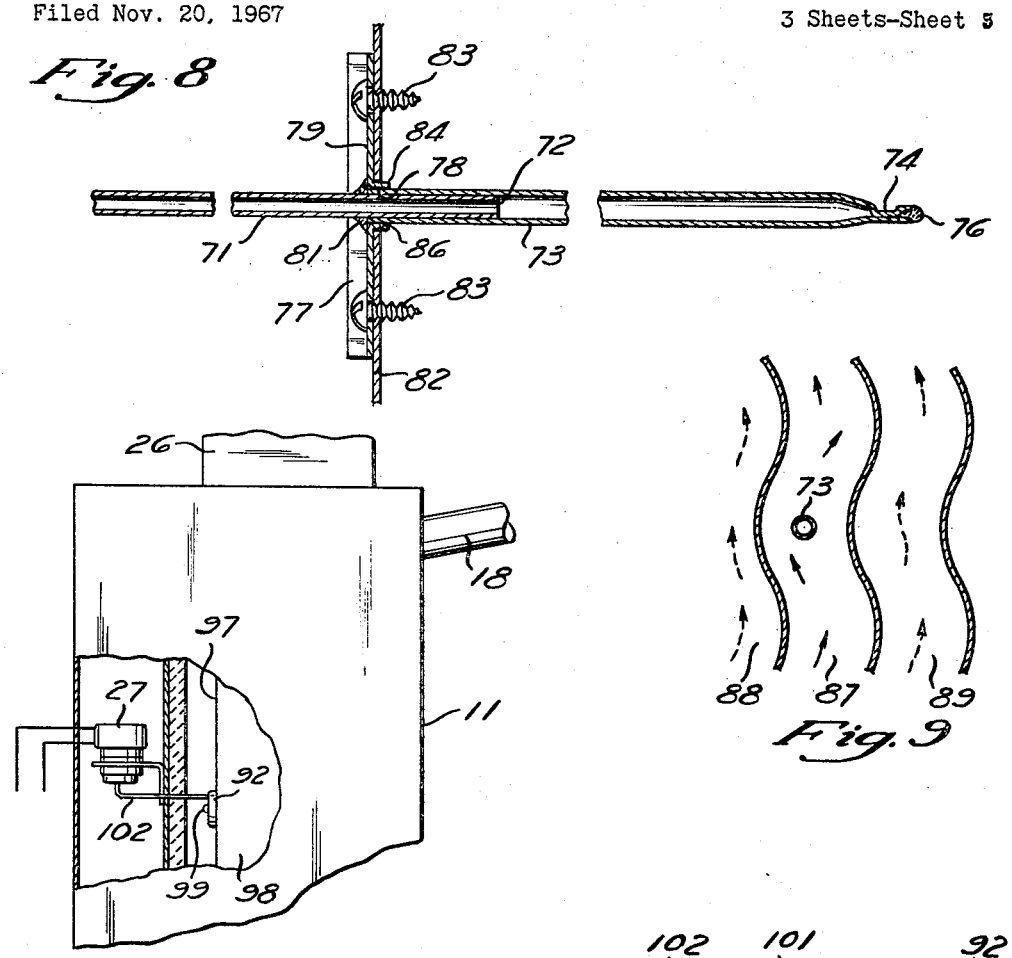

United States Patent Office 3,494,551
Patented Feb. 10, 1970

3,494,551
FURNACE CONTROL SYSTEM
Harold F. Snider, Mansfield, Ohio, assignor to Therm-O-Disc Incorporated, Richland County, Ohio, a corporation of Ohio
Continuation-in-part of application Ser. No. 621,164, Mar. 7, 1967. This application Nov. 20, 1967, Ser. No. 697,251
Int. Cl. F23n 23/00; F01h 37/32
U.S. Cl. 236—10                                 11 Claims

ABSTRACT OF THE DISCLOSURE

A forced hot air furnace system wherein the fan control thermostat senses the wall temperature or flue gas temperature of the heat exchanger. The thermostat is operated by a control fluid having a liquid-vapor interface located in direct heat exchange relationship with the heat exchanger wall or flue gas when the temperature is substantially equal to or below the control temperature at which the fan is operated. When the temperature exceeds such control temperature by a substantial amount the interface moves to a zone free of direct heat exchange relationship with respect to the wall or flue gas. At such time the control fluid does not sense wall or flue gas temperature and the thermostat is not subjected to excessive pressure.

BACKGROUND OF INVENTION

This is a continuation-in-part of my copending application Ser. No. 621,164, filed Mar. 7, 1967, now abandoned. The present invention relates generally to furnace control systems and more particularly to a system for controlling forced hot air furnaces and the like arranged to improve the effectiveness of the furnace control and to improve the operating efficiency of the furnace.

Automatic forced hot air furnaces are normally provided with a burner intermittently operated to burn a fluid fuel, such as oil or gas. The flue gases from the burner pass through a heat exchanger and then out through the chimney. A fan is provided to pump the heating air through the heat exchanger where it is heated and then through the ducts of the distribution system to the zones or rooms being heated. The heat exchanger provides walls which separate the flue gases from the heating air while acting to transmit the heat from the flue gases to the heating air.

PRIOR ART

Most automatic forced hot air furnaces are provided with thermostatic controls. The burner is controlled by a thermostat in the room area being heated. This thermostat operates to turn the burner on-and-off to regulate the amount of heat supplied by the furnace. A separate fan thermostat is usually provided to operate the fan only when the temperature of the air in the heat exchanger exceeds selected predetermined temperatures. In such systems the fan thermostat is arranged to sense the air temperature at a selected location in the heat exchanger. In such furnace systems there is a tendency for the fan to cycle on-and-off when the burner first ignites and to again cycle on-and-off after the burner shuts-off.

This on-and-off cycling results from the fact that the heating air tends to be relatively stationary or moves with a low velocity when the fan is not operating and flows with a much higher velocity when the fan operates. When the burner first ignites and the heat exchanger walls start to heat up, the relatively stationary air within the heat exchanger is often heated to the operating temperature of the fan thermostat before the walls reach the temperature required to maintain such operating heating air temperature under fan operating conditions. When this occurs the fan operates for a few moments and then shuts-off, because the rate of heat transfer to the heating air is too low to maintain the operating temperature. Consequently, the fan cycles on-and-off until the wall temperature of the heat exchanger increases to a sufficiently high temperature to maintain steady operation.

A similar, but opposite, action occurs after the burner shuts-off. As the wall temperature drops, a point is reached where the rate of heat transfer is too low to maintain control temperature in the heated air being pumped through the heat exchanger. When this occurs the fan thermostat shuts the fan off. However, since the walls are still at a relatively high temperature they raise the temperature of the relatively stationary air in the heat exchanger and the fan is again operated a few moments to replace the heated air with cool, unheated air. This on-and-off cycling continues until the walls of the heat exchanger reach a relatively low temperature.

This repeated cycling is undesirable, since the air within the distribution duct work cools while the fan is off and the cycling causes such cool air to intermittently blow into the rooms being heated. This causes cold drafts and uneven heating within the rooms being heated. It also results in lower thermal efficiency since a substantial portion of the heat remaining in the heat exchanger while the fan is off is lost through the chimney. Further, the cycling results in a waste of electrical power since there is a power surge each time the fan motor starts. Still further, it produces irritating changes in the noise level in the rooms of the building being heated.

When smaller, higher velocity heat exchangers are used another problem is present. When the flow rate of the heating air through the heat exchanger is increased an uneven flow pattern may result. It is therefore more difficult to establish a location within the heating air zone of the heat exchanger which has a consistent relationship to the output temperature of the furnace. Also, in many instances, the flow pattern of the heating air through the heat exchanger is affected to a substantial degree by the particular duct work to which the furnace is connected and by other installation conditions of the furnace. Consequently the temperature characteristics of a particular location within the heat exchanger is often affected by the duct system and the installation arrangement of the furnace. Since the location of the sensor of the fan thermostat is established during manufacture of the furnace, a given furnace design may operate well in one installation and not in another installation because the latter installation may cause the temperature characteristics at the location of the fan thermostat sensor to be different than the design characteristics established for proper operation.

SUMMARY OF INVENTION

In accordance with one aspect of this invention, a system is provided wherein the fan thermostat senses the wall temperature of the heat exchanger and operates the furnace fan whenever the wall temperature is above predetermined operating temperatures. When the burner first ignites, the wall temperature starts to increase. The fan thermostat initiates fan operation when the wall temperature reaches a desired control temperature. The initiation of relatively high flow rates of heating air through the heat exchanger does not cause the wall temperature to drop, so the fan continues to operate without cycling until after the burner shuts-off. After the burner shuts-off the wall temperature starts to drop, but the fan continues to operate until the wall temperature reaches a relatively low value and the fan then shuts-off. Since the wall temperature is relatively low at this time the fan does not cycle on-and-off.

In accordance with another aspect of the invention, a system is provided wherein the thermostat senses the temperature of the flue gases. Since the flue gas temperature rises rapidly after combustion, the fan operation is initiated without cycling shortly after combustion occurs. After the combustion terminates, the heat of the heat exchanger maintains the temperature of the flue gas portion at a relatively high level until the heat exchanger walls cool. Therefore, the fan continues to operate until the heat exchanger cools and then shuts off without recycling.

The elimination of cycling of the fan improves the uniformity of heating since cool duct air is not intermittently blown into the rooms. Also, the thermal efficiency of the furnace is improved since more of the heat that is in the heat exchanger when the burner shuts-off is delivered to the rooms and less heat is lost through the chimney.

In both systems, where heat exchanger wall temperature is sensed and where flue gas temperature is sensed, the operating temprature of the fan thermostat is well below temperature reached during steady operation. Therefore, consistent control is achieved and slight variations in operating temperature of the thermostat does not materially alter the operation of the system.

In the system in which wall temperature is sensed, consistent operation is also improved since the walls are formed of high conducting materials, usually ferrous metals, and the temperature of the wall does not vary materially as a result of changes of flow patterns through the heat exchanger.

In systems in which the flue gas temperature is sensed, consistency of operation is also improved, when compared to sensing heating air, since rapid and drastic changes in the rates of flue gas flow do not occur since the flue gases are not pumped by an intermittently operating fan.

In the illustrated embodiments the fan thermostat is operated by changes in the pressure of a control fluid. The control fluid is located in a tube and has a liquid-vapor interface. The pressure of the control fluid is determined by the temperature of the interface. The fan thermostat is arranged so that the liquid-vapor interface is in direct heat exchange relationship with the heat exchanger wall, or the flue gases, only when the wall or flue gases are at temperatures substantially equal to or below the control temperatures at which the fan is initially operated.

When the wall or flue gas temperature substantially exceeds such operating temperatures, the interface moves to a tube location in which it is substantially free of direct heat exchange relationship with the heat exchanger wall or flue gas. Therefore, the thermostat does not sense or "see" the wall temperature or the flue gas temperature when such temperature substantially exceeds the control temperatures, and the thermostat is not subjected to excessive or damaging pressures.

In a typical installation of the first embodiment, the fan thermostat operates to start the fan when the wall temperature of the heat exchanger reaches about 180° F. As the burner and fan continue to operate, the wall temperature continues to increase until it stabilizes at about 350° F. to 500° F. However, since the control fluid interface moves out of direct heat exchange relationship with the heat exchanger wall, the thermostat does not "see" this temperature and is not subjected to excessive or damaging pressures.

After the burner shuts-off, the fan continues to operate while the heat exchanger wall temperature drops. The control fluid interface moves back into direct heat exchange relationship with the heat exchanger wall as the wall temperature drops to values approaching control temperature. When the wall temperature drops to about 140° F., the thermostat shuts the fan off. At this time the temperature of the wall is already below the temperature required to initiate fan operation, so the fan does not cycle after the burner shuts-off.

In a typical installation, wherein the flue gas temperature is sensed, the thermostat closes and initiates fan operation when the flue gas temperature reaches about 300° F. and terminates fan operation when the flue gas temperature drops to about 250° F. During operation the flue gas temperature normally reaches 500° F. to 550° F. In both embodiments the temperature of the zone being sensed stabilizes at a temperature well above thermostat operating temperature so consistent operation is achieved.

OBJECTS OF INVENTION

It is an important object of this invention to provide a novel and improved control system for furnaces, and the like, which is not subject to intermittent cycling during the initial or terminal portions of a basic heating cycle.

It is another important object of this invention to provide a novel and improved control system for furnaces, and the like, which operates with accuracy and consistency even in systems having high performance, relatively small size heat exchangers.

It is another important object of this invention to provide a novel and improved heater control system including a pump operable to circulate a heating fluid through the system heat exchanger in combination with a pump control thermostat arranged to sense the flue gas temperature or the wall temperature of the heat exchanger.

It is another important object of this invention to provide a novel and improved heating system, according to the last preceding object, wherein the thermostat is protected against damage resulting from excessive temperatures.

It is another important object of this invention to provide a novel and improved forced hot air furnace system, or the like, having a fan operable to circulate heating air through the system heat exchanger in combination with a thermostat operated by a control fluid arranged to sense the wall temperature or flue gas temperature of the heat exchanger.

It is still another important object of this invention to provide a system, according to the last preceding object, wherein the control fluid of the thermostat provides an interface in direct heat exchanger relationship with the heat exchanger wall or flue gas only when the temperature is substantially equal to or below the operating temperatures of the thermostat.

Further objects and advantages will appear from the following description and drawings, wherein:

FIGURE 1 is a schematic illustration, partially in section, of a forced hot air furnace system incorporating this invention;

FIGURE 2 is an enlarged, schematic illustration of the heat exchanger of the furnace of FIGURE 1 illustrating the flow paths of the flue gases and heating air through the heat exchanger and also illustrating one structure for supporting the sensor tube of the fan control thermostat;

FIGURE 3 is a schematic illustration, similar to FIGURE 2, illustrating a modified heat exchanger of the counter flow type;

FIGURE 4 is an enlarged fragmentary schematic illustration of the furnace and the fan control thermostat illustrating the condition of the themostat when the heat exchanger temperature is below fan operating temperatures;

FIGURE 5 is a fragmentary schematic illustration, similar to FIGURE 4, illustrating the condition of the thermostat immediately after the thermostat initiates fan operation;

FIGURE 6 is a fragmentary schematic illustration, similar to FIGURES 4 and 5, illustrating the thermostat condition when the heat exchanger temperature exceeds the operating temperature of the thermostat by a substantial amount;

FIGURE 7 is a fragmentary schematic illustration of a modified form of furnace fan thermostat wherein a small capillary tube connects the switch mechanism to an enlarged end to decrease the volume per unit length of a portion of the capillary tube assembly. This increases the movement of the interface for a given amount of overtravel of the snap disc;

FIGURE 8 illustrates one structural arrangement of temperature sensor and mounting bracket which is particularly adapted for use in systems arranged to sense flue gas temperature;

FIGURE 9 is a schematic illustration of the sensor mounted in the flue gas portion of a heat exchanger;

FIGURE 10 is a fragmentary view, partially in section, of a thermostat mounted to sense wall temperature wherein the end of the tube is located in a disc;

FIGURE 11 is an exploded perspective view illustrating the disc structure; and,

FIGURE 12 is a perspective view of the assembled disc.

FIGURE 1 schematically illustrates a typical forced hot air furnace provided with a control system incorporating this invention. The furnace includes a heat exchanger 10 mounted within the furnace cabinet 11. A burner 12 is supplied with fuel, such as oil or gas, through a supply line 13 and a burner control 14. The burner control 14 is intermittently operated by a room thermostat 16 appropriately located in the area being heated. When heat is required the thermostat 16 operates the burner control 14 which in turn operates to supply fuel to the burner 12 and to ignite the fuel. When sufficient heat has been supplied to raise the room air temperature adjacent to the thermostat 16 to the proper temperature, the thermostat 16 operates to shut off the fuel and extinguish the flame.

Air is supplied to the burner through a cabinet opening 17 and flue gases are produced which pass upwardly through the heat exchanger 10 to a flue pipe 18 connecting the heat exchanger with a chimney 19. The flow of the flue gases is illustrated by solid arrows 21 and the flow of the heating air is illustrated schematically by dotted arrows 22.

A fan or blower 23 is driven by an electric motor 24 and operates to pump heating air 22 through a plenum 25 of the heat exchanger 10 and up through the heat exchanger to the plenum 26 of the furnace. The plenum 26 is connected to the usual distribution system (not shown) including duct work and registers which operate to deliver the heated air to the various zones or rooms within the building being heated.

The fan motor 24 is operated by a fan thermostat 27 mounted within the cabinet 11. The fan thermostat 27 includes a switch which closes to operate the fan motor 24 and opens when fan operation is not required. The thermostat 27 also includes a capillary tube 28 which extends into the heat exchanger 10 and contains a control fluid which operates the switch of the thermostat 27. In the illustrated furnace the cabinet 11 is provided with an insulated wall 29 around the heat exchanger 10 and spaced therefrom to provide a chamber 31 surrounding the heat exchanger 10. Most of the heating air 22 flows through the heat exchanger, but a portion flows through the chamber 31. This heating air is at a temperature which is low when compared to the temperature of the heat exchanger walls and the temperature of the flue gases 21, so that the cabinet 11 is not subjected to excessive heats.

FIGURE 2 is a schematic representation of a portion of the heat exchanger 10. The heat exchanger 10 is provided with a plurality of walls 32 through 35 which divide the heat exchanger into a plurality of flow spaces 36 through 40. Alternate flow spaces 36, 38 and 40 are open at their lower end to a plenum 25 which delivers the heating air 22 from the fan 23 to the heat exchanger 10. These flow spaces 36, 38 and 40 are also open at their upper end to the plenum 26 so that heating air 22 pumped through the heat exchanger 10 by the fan 23 flows through a plurality of parallelly connected flow spaces in an upward direction.

The intermediate flow spaces 37 and 39 are open at their lower end to the combustion chamber 45 in which the burner 12 is located and are open at their upper ends to the flue gas pipe 18. Consequently, the flue gas 21 flows up through the heat exchanger 10 through a plurality of flow paths 37 and 39 which cooperate to form the flue gas circuit of the heat exchanger. It should be understood that various heat exchanger designs and structures can be utilized so long as they provide separate flow paths for the air and the flue gases.

In FIGURE 2 the walls 32 through 35 are illustrated as curved, since it is customary to construct the heat exchanger walls in such a manner that the flow of gases and air is sufficiently turbulent to eliminate stratification along the walls. The heat exchanger walls 32 through 35 may be formed of any suitable material having a high thermal conductivity. Generally the heat exchangers are formed of steel.

As the flue gases 21 flow through the flow spaces 37 and 39 the adjacent walls 32 through 35 are heated and in turn heat the air flowing through the flow spaces 36, 38 and 40. In this manner a portion of the heat imparted to the flue gases by the burning of the fuel in the burner 21 is transferred to the heating air 22 with the remaining heat carried by the flue gases out through the chimney 19.

Mounted on one of the heat exchanger walls 33 is an elongated bracket 41 which extends laterally along the wall 33. In the illustrated embodiment the bracket 41 is formed of sheet metal welded or otherwise suitably fastened to the wall 33 at 42. The bracket is formed with two legs which cooperate with a portion of the wall 33 to define an elongated chamber 43 isolated from the flow space 38. The capillary tube 28 extends along the chamber 43 and normally rests at the lower junction between the bracket 41 and the wall 33. Consequently, the portion of the capillary tube 28 within the chamber 43 is in direct heat exchange relationship with the wall 33. However, it is not necessary for the portion of the tube 28 within the chamber 43 to be in direct physical contact with the bracket 41 and wall 33, since the chamber 43 is surrounded by relatively high conductive metal and is maintained at substantially the same temperature as the adjacent portions of the wall 33.

In the structure illustrated in FIGURE 1 the portion 44 of the capillary tube 28 remote from the thermostat 27 is in direct heat exchange relationship with the wall 33 of the heat exchanger, a second portion 46 extends through the zone 31 to the insulated wall 29 and a third portion 47 connects the second portion 46 with the body of the thermostat 27.

FIGURE 3 illustrates another form of heat exchanger which may be used. In this heat exchanger the flue gases 21 again flow upwardly through the spaces 37 and 39, but the heating air 22 flows downwardly through the spaces 36, 38 and 40. Counterflow heat exchangers of the type illustrated in FIGURE 3 are sometimes used in furnaces and the two types of FIGURES 2 and 3 are illustrated only to establish that the particular type of heat exchanger used in the furnace is not critical to this invention. Here again, a bracket 41 is mounted on one of the walls 33 of the counterflow heat exchanger illustrated in FIGURE 3 and cooperates with the wall 33 to form a chamber 43 along which the portion 44 of the capillary tube 28 extends.

Referring now to FIGURES 4 through 6, the thermostat 27 is provided with a switch consisting of a fixed contact 51 and a movable contact 52. Mounted in the thermostat body is a snap disc 53 which is sealed around its periphery with the body 55 of the thermostat 27 and cooperates therewith to form a chamber 54 filled with control fluid. One end of the capillary tube 28 is open to the chamber 54 and the other end 56 is closed, so the lower side of the snap disc 53 is subjected to the pressure of the control fluid 57. A pusher 58 extends between the upper side of the snap disc 53 and the movable contact 52.

The various elements are proportioned so that the movable switch contact 52 is spaced from the stationary contact 51 and the switch is open when the snap disc 53 is in the downwardly curved position of FIGURE 4. However, when the snap disc 53 snaps through to an upwardly curved position, as illustrated in FIGURE 5, the pusher 58 moves the movable contact 52 into engagement with the stationary contact 51 and the switch is closed. The fan motor 24 is operated when the switch of the thermostat 27 is closed.

The control fluid 57 in the capillary tube 28 is in the liquid state between an interface 59 and the chamber 54 and is in the vapor state between the interface 59 and the closed end 56 of the capillary tube 28. When a closed tube of this type is filled with a control fluid having a liquid-vapor interface 59 the pressure of the fluid is determined by the temperature of the interface. As the temperature of the interface increases the pressure of the control fluid also increases. Conversely decrease in temperature of the interface 59 results in decreasing pressure in the control fluid 57.

The various elements are proportioned so that the interface 59 is located in the portion 44 of the capillary tube 28 contained within the chamber 43 when the snap disc 53 is in the switch open position of FIGURE 4. As the temperature of the interface 59 is increased by increases in the wall temperature of the heat exchanger 10 the pressure of the control fluid 57 increases until sufficient pressure is present to cause the snap disc 53 to snap to its upper curved position of FIGURE 5. This closes the thermostat switch. The snapping of the disc 53 to its upper position increases the volume of the chamber 54, so a larger volume of control fluid is required to fill the chamber 54 and the interface 59 moves to a position 59a, as illustrated in FIGURE 5. The various elements are proportioned however so that the interface at 59a is still located within the portion 44 of the capillary tube 28 within the heat exchanger 10, so the interface is still in direct heat exchange relationship with the wall of the heat exchanger. The blower motor 24 starts to blow heating air through the heat exchanger when the wall temperature of the heat exchanger reaches a sufficiently high temperature to snap the disc 53 from the position of FIGURE 4 to the position of FIGURE 5. The system may be designed to provide for closing of the thermostat switch at any desired predetermined wall temperature. However, I prefer to arrange the thermostat so that the switch is closed and the blower motor is started when the wall temperature of the heat exchanger is about 180° F.

As the burner continues to operate the wall temperature of the heat exchanger continues to increase, and in a typical installation stabilizes at about 350° F. to 500° F. As the wall temperature increases above 180° the temperature of the interface 59 further increases and causes the interface to move to the position 59b, illustrated in FIGURE 6. This causes an additional slight deflection of the disc 53 increasing the volume of the chamber 54 slightly to accommodate the additional control fluid 57 necessary to permit the interface to move to the position 59b. However, the volume change of the chamber 54 between the positions of FIGURES 5 and 6 is small compared to the volume change between the positions of FIGURES 4 and 5. The thermostat switch and the disc 53 are constructed to accommodate this slight over-travel without damage.

When the interface is in the position 59b it is located in the portion of the tube 46 located in the chamber 31 and is not in direct heat exchange relationship with the wall of the heat exchanger 10. In a normal installation the interface will only reach a temperature of about 250° F., the temperature of the heating air then passing through the zone 31. Consequently the control fluid does not "see" the high temperature, about 500° F., of the heat exchanger wall and the thermostat is not subjected to damaging high pressures.

The thermostat 27 remains closed and causes continuous operation of the blower fan so long as the burner continues to operate. When the burner shuts off the fan continues to operate until the wall temperature drops to a temperature of about 140° F. As the temperature of the wall of the heat exchanger drops the interface of the control fluid moves back into the portion 44 of the capillary tube in direct heat exchange relationship with the heat exchanger wall. For example, when the temperature of the heat exchanger wall drops to about 180° F. the interface is located in about the position of 59a. The shut off temperature is lower than the temperature at which the disc snaps to the switch closing position because less control fluid pressure is required to maintain the disc in the upper position of FIGURE 5 than is required to snap the disc to this position from the position of FIGURE 4.

When the pressure of the control fluid drops to a sufficiently low value the snap disc 53 snaps back to its initial position of FIGURE 4 and the fan motor is shut off. It is apparent that recycling or intermittent fan operation cannot occur since the wall temperature of the heat exchanger is already below the temperature required to close the thermostat switch.

In order to provide a fail-safe function it is preferable to arrange the disc 53 so that it will assume a switch closed position when it is exposed to atmospheric pressure on both sides. With such an arrangement the control fluid must be chosen to provide a pressure below atmospheric pressure when the interface 59 is at the temperature requiring a switch open condition. The fan will then turn on and will prevent excessive temperatures from occurring within the furnace in the event that the capillary tube is damaged and the control fluid 57 is lost. A suitable fluid for such fail-safe thermostats is trichloroethylene.

It is important that the interface remain in the portion 44 in direct heat exchange relationship with the wall of the heat exchanger 10 whenever the temperature of the interface is equal to or below the interface temperature required to close the switch, so that hunting will not occur. It is also desirable to arrange the thermostat so that the interface moves out of the portion 44 and out of direct heat exchange relationship with the wall of the heat exchanger when the interface temperature is elevated a relatively small amount above the temperature required to close the thermostat, so that excessive pressures are not developed in the thermostat. To meet these two conditions it is desirable to provide a relatively small diameter capillary tube in the portion of the capillary tube between the interface position of 59a and the interface position of 59b. However, sufficient volume of liquid must be present between the interface position of 59, illustrated in FIGURE 4, and the position of 59a, illustrated in FIGURE 5, to cause the snap disc 53 to move from the position of FIGURE 4 to the position of FIGURE 5.

When only a relatively small over-travel of the snap disc can be tolerated a structure of the type illustrated in FIGURE 7 may be used. This structure may also be used when the length available within the heat exchanger is small. In the embodiment of FIGURE 7 similar parts are designated by similar reference numerals, but a prime (′) is added to indicate reference to the embodiment of FIGURE 7.

In this embodiment the capillary tube 28′ is formed with a relatively small diameter from the chamber 54′ to the location 61′ within the heat exchanger 10′. An enlarged diameter portion 62′ constitutes the remainder of the capillary tube beyond the point 61'. As an illustrative example the portion 28' may be formed of tubing having an inside diameter of .015 inch and the portion 62' of the tube is formed of tubing having an inside diameter of .045 inch. In such a structure the ratio of volume per unit length of the two tube portions is 9 to 1 and the distance between 59a' and 59b' may be quite large for a given change in volume of the chamber 54'. The various parts of the thermostat 27' are arranged so that the interface 59' is located within a large diameter portion 62' when the switch is in the open condition and moves to a location 59a' within the small diameter portion of the capillary tube 28' when the switch closes. Further increases in temperature cause the interface to move to a zone exterior of the heat exchanger at 59b'. The use of a small diameter for the portion of the capillary tube between the points 59a' and 59b' results in substantial interface movement without excessive pressure and temperature changes. The embodiment of FIGURE 7, therefore, functions in the same manner as the embodiments of FIGURES 4 through 6.

FIGURE 8 discloses one preferred structural arrangement of a capillary tube having a relatively small diameter tube portion extending from the heat exchanger to the thermostat and a relatively large diameter portion within the heat exchanger. This structure is particularly adapted for sensing flue gas temperature, but can also be used in systems of the type illustrated schematically in FIGURE 7. The structure includes a small diameter tube 71 extending from the thermostat to an inner end at 72 within the heat exchanger. The end of the small diameter tube closely fits into the end of a larger diameter tube 73 which is pinched at its end 74 and sealed, for example, by welding or the like at 76.

A bracket 77 is provided with a central flanged opening 78 adapted to closely fit the outside of the tube 73. The open end of the tube 73 extends through the opening 78 with its end substantially aligned with the outer face 79 of the bracket 77. The two tubes are secured to the bracket by a single weld or the like 81 which operates to join the two tubes 71 and 73 and provide a fluid tight joint therebetween and also operates to secure both tubes to the bracket 77. Thus a single weld or the like functions to permanently connect the entire assembly. The bracket 77 is arranged to be secured to an exterior wall 82 of the heat exchanger by sheet metal screws or the like 83 with the flange 84 extending through an opening 86 in the heat exchanger wall 82. With this structure it is a simple matter to install the temperature sensing probe on the heat exchanger and the installation automatically positions the two tubes in the desired manner with respect to the heat exchanger wall.

In one typical installation the inside diameter of the tube 71 is 0.025 inch and the inside diameter of the tube 73 is 0.083 inch. With such a diameter relationship, the volume per unit length of the tube 73 beyond the end 72 is more than ten times the volume per unit length of the tube 71. Therefore, a relatively short length of tubing 73 provides sufficient volume for proper operation of the thermostat and the interface movement along the tube 71 is relatively large for a given volumetric change of the chamber of the thermostat. The various elements should be arranged so that the interface between the liquid and vapor of the control fluid is in the tube 73 between the ends 72 and 74 when the switch is open and moves to a position in the tube 71 between the wall 82 and the end 72 when the switch first snaps closed. The various elements are also arranged so the interface moves along the tube 71 to position outside of the heat exchanger, to the left of the wall 82 as viewed in FIGURE 8, before excessive pressures are developed. This area external of the heat exchanger is at a lower temperature as discussed above. With this structural arrangement an exact amount of small diameter tube 71 is positioned inside the heat exchanger between the wall 82 and the end 72. This length is determined during the manufacture of the probe itself when accurate control is possible.

The structure of FIGURE 8 is particularly desirable when the temperature probe is positioned to sense flue gas temperature as illustrated in FIGURE 9. In FIGURE 9 a heat exchanger is schematically illustrated wherein the flue gas passes through the space 87 as illustrated by the solid arrows and the heating air passes through spaces 88 and 89 as indicated by the dotted arrows. In this installation the tube 73 is located in the flue gas space 87.

In a typical installation the thermostat is arranged so that the switch is closed and the interface moves to the portion of the small diameter tube 71 within the heat exchanger when the temperature of the flue gases then continues to elevate while the fan operates until it stabilizes at a temperature in excess of 500° F. As this occurs, the interface moves to an external portion of the tube 71.

After combustion is terminated, the flow rate of the flue gas tends to drop as the wall temperature of the heat exchanger drops, so the temperature of the flue gases tend to approximate the temperature of the walls of the heat exchanger. When the temperature in the flue gas portion drops to a temperature of about 250° F., the interface is back within the heat exchanger to accurately determine the temperature of the flue gas. The thermostat switch opens to terminate fan operation when the heat exchanger and flue gases drop to a temperature of about 250° F. Because most of the heat is out of the heat exchanger at this time, recycling does not occur and most of the available heat is delivered to the areas being heated. Even if the wall temperatures of the heat exchanger are above the temperature of the flue gases at the time the furnace fan is shut off, recycling will not occur since the thermally induced circulation of the flue gas through the heat exchanger is not altered by shutting off the fan and the flue gas temperatures will not raise back up to a sufficiently high temperature necessary to again turn on the fan.

In both embodiments of this invention, wherein flue gas temperature or heat exchanger wall temperature is sensed, the sensing probe is arranged to operate the thermostat at a temperature substantially below the stabilized temperature of the sensed portion of the heat exchanger. Consequently, consistent operation is achieved and intermittent cycling does not occur.

FIGURES 10 through 12 indicated one preferred structural arrangement for mounting a wall sensing thermostat tube. In this arrangement the end of the tube is coiled as illustrated in FIGURE 11 with the coil 91 positioned within a metallic cup-shaped member 92. A cover 93 retains the coil in the cup 92 and is secured in position by cliniching the walls of the cup 92 at 94 as illustrated in FIGURE 12. The end of the tube, which is coiled within the cup 92 along with the cup 92 and cover 93, form a disc which is mounted on the exterior wall of 97 of the heat exchanger 98 as illustrated in FIGURES 10 and 12 by a suitable fastener such as a sheet metal screw 99. Since the cup-shaped member 92 is formed of metal or other high conductive material, the entire coil 91 is maintained at a temperature substantially equal to the wall temperature of the heat exchanger. The tube emerges from the disc assembly at 101 so the portion of the tube outside the disc assembly is not in heat exchange relationship with the wall. Consequently the length of the tube in direct heat exchange relationship with the wall of the heat exchanger is accurately determined during the manufacture of the disc assembly.

The various elements are arranged so that the interface of the control fluid is within the coil 91 at all temperatures below the closing temperature of the thermostat and moves past the point 101 into the portion 102 before excessive pressures occur. Here again the structure is arranged to provide accurate control of the portion of the tube in direct heat exchange relationship with the wall of the heat exchanger and to eliminate any requirement of precision during the installation of the thermostat in the furnace.

This structural arrangement also provides for easy installation and/or removal if servicing is required. Further it does not require any special structure on the heat exchanger itself since the disc assembly is attached by a simple sheet metal screw.

With a fan control thermostat incorporating the present invention intermittent cycling of the fan does not occur as the burner first ignites and also does not occur after the burner shuts off. Further, the control accuracy of the thermostat is improved even when used with heat exchangers having relatively high heating air velocities, since the temperature sensed by the thermostat is not materially affected by the pattern of flow of heating air through the heat exchanger.

Although preferred embodiments of this invention are illustrated, it is to be understood that various modifications and rearrangements of parts may be resorted to without departing from the scope of the invention.

What is claimed is:

1. A forced hot air furnace system comprising a heat exchanger, a burner intermittently operable to produce flue gases for flow through said heat exchanger, a fan intermittently operable to blow air over said heat exchanger, said heat exchanger including wall means defining a portion of a passage for the flow of flue gases and a portion of a separate passage for the flow of heating air moved by said fan, said wall means being in direct heat exchange relationship between said flue gases and heating air and cooperating with said flue gases as heat supply means to supply heat to said heating air, thermostat means operable to sense the temperature of a portion of said heat supply means and control said fan in response to changes in temperature thereof, said thermostat means including a tube filled with a control fluid, the pressure of which changes in response to changes of temperature of said control fluid, said tube including a first portion in direct heat exchange relationship with the sensed portion of said heat supply means and a second portion free of direct heat exchange relationship with said sensed portion, said control fluid including a liquid-vapor interface located in said first portion of said tube when the temperature of said sensed portion of said heat supply means is within a predetermined temperature range, said interface being located in said second portion when the temperature of said sensed portion exceeds said temperature range, said thermostat means operating to initiate and terminate fan operation in response to movement of said interface along said first portion and to continue fan operation when said interface is in said second portion, the maximum pressure of said control fluid in said tube being substantially below the pressure such fluid would reach if the interface were at the maximum temperature of said heat supply means.

2. A forced hot air furnace system as set forth in claim 1 wherein said furnace includes a casing cooperating with said heat exchanger to define said separate passage for the flow of said heating air, and said second portion is located in said separate passage for said heating air.

3. A forced hot air furnace system as set forth in claim 2 wherein said first portion is in direct heat exchange relationship with said flue gases.

4. A forced hot air furnace system as set forth in claim 1 wherein said first portion is in direct heat exchange relationship with said flue gases.

5. A forced hot air furnace system as set forth in claim 1 wherein said first portion is in direct heat exchange relationship with said wall means.

6. A forced hot air furnace system as set forth in claim 5 wherein a disc shaped bracket is secured to said wall means and said first portion is a coil secured to said bracket, said second portion being spaced from said bracket.

7. In a furnace system including a heat exchanger providing wall means defining a portion of a passage for the flow of flue gases and a portion of a separate passage for the flow of heating air, a burner intermittently operable to produce flue gases for flow through said passage for flue gases, a fan intermittently operable to blow air through said separate passage, and thermostatic means operable to control said fan, said thermostatic means comprising switching means, expansible chamber means, the volume of which is changed by changes in pressure therein, said switching means being operated by changes in volume of said chamber means, a tube in fluid communication with said chamber means, a control fluid in said tube having a liquid-vapor interface, and a bracket on said tube secured to the wall of said heat exchanger, said bracket being located on said tube so that a first portion of said tube is positioned in direct heat exchange relationship with said wall or said flue gases and a second portion of said tube is isolated from direct heat exchange relationship with said wall and said flue gases, said switching means opening and closing in response to movement of said interface along said first portion, and said chamber being operable to accommodate sufficient volume to permit said interface to move from said first portion to said second portion without producing excessive pressure.

8. A furnace system as set forth in claim 7 wherein said tube includes a first tube member having an inside diameter, a second tube member having a smaller inside diameter connected to said first tube with a fluid tight joint, and said bracket is connected to said tube members so that said first tube member and a predetermined length of said second tube member is inside of said heat exchanger.

9. A furnace system as set forth in claim 8 wherein said first tube member is directly connected to said bracket and said second tube member extends a predetermined length into said first tube member beyond said bracket, and a single weld or the like directly connects said bracket to both of said tube members and also provides a sealing connection between said tube members.

10. A furnace system as set forth in claim 7 wherein said bracket is disc shaped and is adapted to be directly connected to the wall of a heat exchanger, and said first portion is a coil secured in said bracket.

11. A furnace system as set forth in claim 7 wherein said expansible chamber means includes a relatively rigid body and a snap element movable to a first position in response to increases in pressure of said control fluid to a first pressure and movable to a second position in response to decreases in pressure of said control fluid to a second pressure below said first pressure, movement of said snap element between said first and second positions operating said switching means, said snap element being movable to a third position in response to increases in pressure of said control fluid to a third pressure higher than said first pressure, said interface being located within said first portion when said control fluid is at a pressure equal to or below said first pressure and being in said second portion when said control fluid is at said third pressure.

References Cited

UNITED STATES PATENTS

| | | | |
|---|---|---|---|
| 1,781,287 | 11/1930 | Levy | 200—140 |
| 2,045,289 | 6/1936 | Bolin | 236—99 |
| 2,209,610 | 7/1940 | Persons | 236—10 |
| 2,640,313 | 6/1953 | Cobb | 200—140 |
| 2,688,064 | 8/1954 | Traver | 200—140 |
| 2,767,922 | 10/1956 | Rennecamp. | |
| 3,284,600 | 11/1956 | Mertler | 200—140 |

(Other references on following page)

UNITED STATES PATENTS

| | | | |
|---|---|---|---|
| 3,354,280 | 11/1967 | Slonneger | 200—140 |
| 2,127,592 | 8/1938 | Ford | 73—368 X |
| 1,724,804 | 8/1929 | Root | 236—32 |
| 1,925,530 | 9/1933 | Gotthardt | 236—99 |
| 2,499,523 | 3/1950 | Olds | 236—10 |
| 2,822,985 | 2/1958 | Johnson et al. | 236—99 |

EDWARD J. MICHAEL, Primary Examiner

U.S. Cl. X.R.

73—368; 337—321